United States Patent [19]

Sul

[11] Patent Number: 4,545,462

[45] Date of Patent: Oct. 8, 1985

[54] LIFT FOR VEHICLE MAINTENANCE

[76] Inventor: Yun T. Sul, 465-4 Taemyong-dong, Nam-ku, Taegu City, Rep. of Korea

[21] Appl. No.: 506,835

[22] Filed: Jun. 22, 1983

[51] Int. Cl.$^4$ .............................................. B60S 13/00

[52] U.S. Cl. ................................ 187/8.41; 254/89 H

[58] Field of Search .................... 187/8.41, 8.45, 8.54, 187/8.59, 8.75, 8.61, 8.62, 8.67, 8.74; 254/2 R, 2 B, 2 C, 89 R, 89 H, 93 R, 93 L

[56] References Cited

U.S. PATENT DOCUMENTS

| | | | |
|---|---|---|---|
| 1,710,442 | 4/1929 | Warshaw | 187/8.59 |
| 2,702,606 | 2/1955 | Young | 187/8.41 |
| 3,279,562 | 10/1966 | Farrell | 187/8.41 |
| 3,338,334 | 8/1967 | Matthews | 187/8.59 |

FOREIGN PATENT DOCUMENTS

| | | | |
|---|---|---|---|
| 164337 | 7/1955 | Australia | 187/8.59 |
| 31442 | 3/1977 | Japan | 187/8.41 |

*Primary Examiner*—H. Grant Skaggs
*Assistant Examiner*—Kenneth Noland
*Attorney, Agent, or Firm*—Birch, Stewart, Kolasch & Birch

[57] ABSTRACT

A hydraulic vehicle lift comprising a pair of hydraulic cylinders with outwardly projecting lifting arms for engaging a vehicle to be lifted. The lifting arms are secured to a housing which includes wheels in rolling contact with the outer surface of the hydraulic cylinders. A cable system extending between the hydraulic cylinders and lifting arms is provided to balance the ascent and descent of the lifting arms on the two cylinders.

6 Claims, 5 Drawing Figures

LIFT FOR VEHICLE MAINTENANCE

BACKGROUND OF THE INVENTION

1. Field of the Invention

The present invention relates to a lift for vehicle maintenance.

Description of Background Art

Hithertofore, vehicle maintenance equipment was equipped with a bar on a piston wherein the bar was shaped in the form of a cross. The former system was very inconvenient and required much money to construct. The present invention overcomes the problems of prior vehicle maintenance equipment.

SUMMARY AND OBJECTS OF THE INVENTION

It is an object of the present invention to provide a vehicle maintenance lift wherein a piston is operatively positioned in a hydraulic fluid pressure cylinder. The piston includes arms projecting outwardly therefrom. The arms are mounted on rollers which engage the outer surface of the hydraulic cylinder.

By supplying hydraulic fluid to the pressure cylinder, the piston is moved relative thereto wherein the piston arms are raised or lowered.

Another object of the present invention is to provide wire ropes between cooperating pairs of hydraulic fluid pressure cylinders and piston arms. The wire ropes balance the ascent and descent of the piston arms of the vehicle maintenance lift.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE INVENTION

Figure 1:
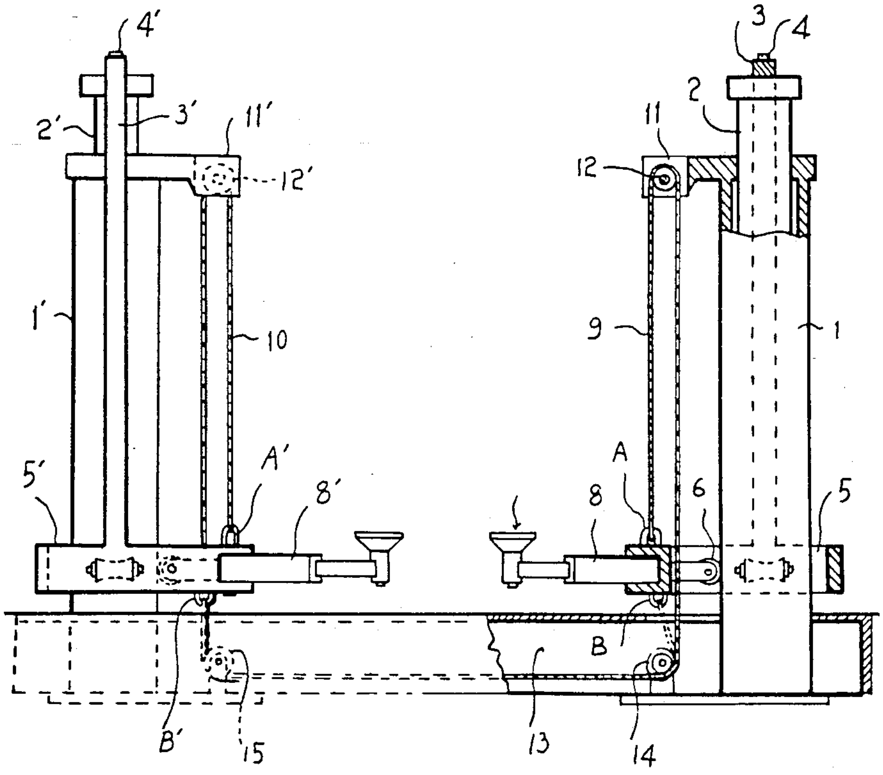
FIG. 1 is a partial cross-sectional side view of a first embodiment of a vehicle lift according to the present invention.

As illustrated in FIG. 1, a pair of hydraulic fluid pressure cylinders 1, 1′ are disposed above the ground surface. The cylinders include a piston rod 2, 2′ operatively disposed therein. A support framing 3, 3′ is operatively connected to the piston rod 2, 2′ by means of bolts 4, 4′, respectively.

A guiding housing 5, 5′ is affixed to the support framing 3, 3′. Rollers 6, 6′ are operatively affixed to the guiding housings 5, 5′ and engage the outer cylindrical surface of the hydraulic cylinders 1, 1′. The guiding housings 5, 5′ include vehicle engaging arms 8, 8′ which are pivotally mounted thereto.

The outer cylindrical housings of the hydraulic cylinders 1, 1′ include a cantilevered upper support member 11, 11′ outwardly projecting therefrom. The upper support 11, 11′ includes a pulley 12, 12′ operatively disposed therein.

A wire cable 9, 10 is operatively affixed to the vehicle engaging arms 8, 8′ by the hang loops A, A′. The wire cable 9 passes over the pulley 12 on the support arm 11 and over a pulley 14 affixed under the ground surface. Thereafter the cable 9 passes over an additional pulley 15 and is affixed to the vehicle engaging arm 8′ by the hand loop B′. Similarly, the cable 10 is affixed to the vehicle engaging arm 8′ by the hang loop A′ and passes over the pulley 12′ in the support member 11′. Thereafter the cable 10 passes over the pulley 15′ (not shown) and the pulley 14′, as shown in FIG. 2, and is thereafter affixed to the vehicle engaging arm 8 by the hang loop B.

Figure 2:
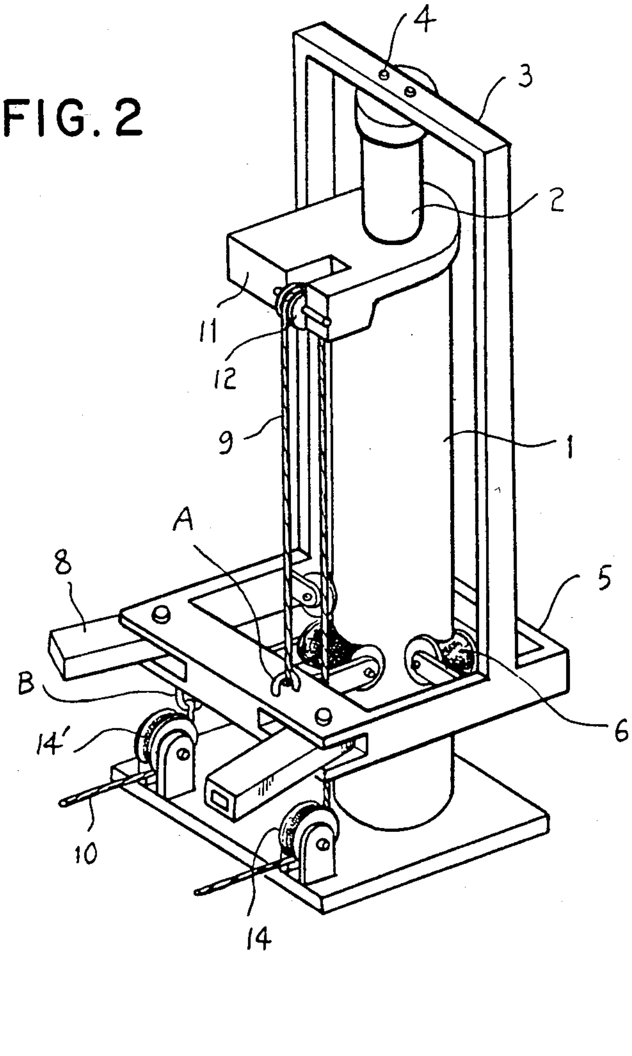
FIG. 2 is an enlarged perspective view of a vehicle lift according to the present invention.

FIG. 2 is a perspective view more clearly showing the lift assembly according to the present invention as shown in the side view of FIG. 1. The floor surface has been removed for a clearer showing of the pulleys 14, 14′. Three rollers 6 are positioned on the guiding housing 5 and engage the outer surface of the hydraulic cylinder 1.

Figure 3:
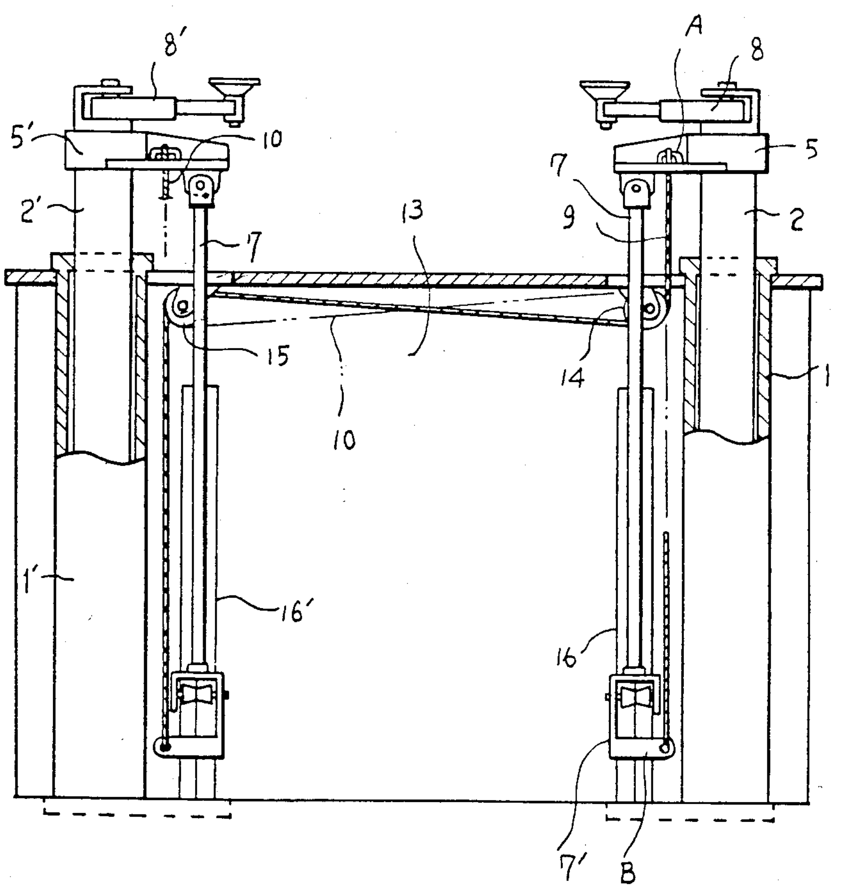
FIG. 3 is a perspective view of a vehicle lift disposed under the ground surface according to a second embodiment of the present invention.

FIG. 3 is a side view showing a second embodiment of the present invention. Like numerals in FIG. 3 represent like elements as described with respect to FIGS. 1 and 2. The lift mechanism illustrated in FIG. 3 is positioned below the ground surface. Guiding posts 16, 16′ are provided which engage wheels positioned within the housing 7′. The guide posts 16, 16′ are disposed on each side of the housing 7′ so as to ensure accurate vertical movement of the mechanism. A rod 7 is operatively connected to the guiding housing 5, 5′ and is affixed to the housing 7′.

The cable 9 is affixed to an arm B on the housing 7′ and passes over the pulleys 15, 14. Thereafter, the cable 9 is affixed to the guiding housing 5 at the hang loop A. Similarly, the cable 10 is affixed to the arm B on the housing 7′ and passes over pulleys 14′, 15′ (not illustrated in the drawings). Thereafter, the cable 10 is affixed to the guide housing 5′ at the hanging loop A′.

Figure 4:
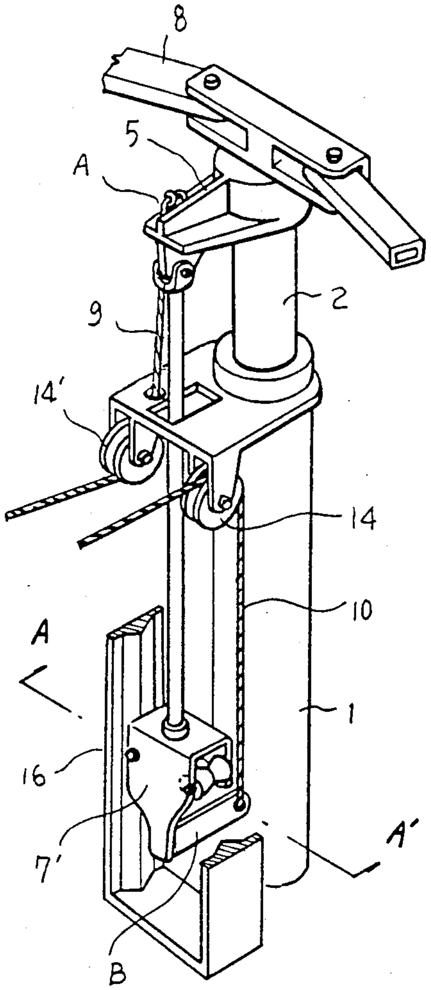
FIG. 4 is an enlarged partial cross-sectional view of a vehicle lift according to the present invention.
Figure 5:
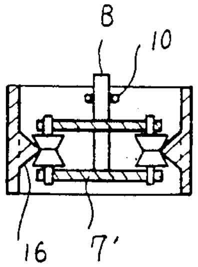
FIG. 5 is a cross-sectional view along lines A–A′ as illustrated in FIG. 4.

FIG. 5 illustrates a cross-sectional view of the housing 7′ along lines A—A illustrated in FIG. 4. The housing 7′ includes two rollers disposed along the outer surface thereof. The guide posts 16 include inwardly projecting members which engage the rollers. The arm B projects outwardly from the housing 7′ and is affixed to the cable 10. In operation, hydraulic fluid is supplied to the hydraulic cylinders 1, 1′ to impose an upward movement to the piston rods 2, 2′. The piston rods 2, 2′ move upwardly thereby moving the support frame 3, 3′ and the guide housing 5, 5′ upwardly along the outer surface of the hydraulic cylinders 1, 1′. The wire cables 9, 10 move along the pulleys and ensure a balance during ascent of the vehicle engaging arms 8, 8′. Similarly, when hydraulic fluid is supplied to the hydraulic cylinders 1, 1′ to cause the piston rods 2, 2′ to descend, the cables 9, 10 ensure a balanced descent of the vehicle.

The invention being thus, described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A lifting device comprising:

two hydraulic cylinders each including a piston means reciprocally movable therein;

each of said piston means having respective lifting arm means operatively associated therewith for engaging an object to be lifted;

cable means extending and operatively associated with said respective lifting arm means for balancing the movement of said piston means;

a lifting arm support means associated with each of said lifting arm means and operatively associated with said piston means;

a guide arm means extending downwardly from said respective lifting arm support means and having wheel means associated therewith, said wheel means being in rolling contact with a guide means; and pulley means positioned adjacent to said cylinder and between said lifting arm support means and said wheel means;

said cable means being secured to said lifting arm support means associated with a first one of said cylinders, extends over one of said pulley means positioned adjacent to said first one of said cylinders, extends to and over a pulley means positioned adjacent to a second one of said cylinders, and extends to and is secured to said lifting arm support means associated with the second one of said cylinders.

2. A lifting device as in claim 1, wherein said guide arm means includes a housing at the lower end thereof, said wheel means positioned within said housing.

3. A lifting device as in claim 2, wherein said guide means comprises two parallel vertically extending guides for rolling contact of said wheel means.

4. A lifting device as in claim 3, wherein said wheel means comprises two wheels, each in rolling contact with one of said two parallel guides.

5. A lifting device as in claim 1, wherein said lifting arm means are pivotally associated with said lifting arm support means.

6. A lifting device as in claim 1, wherein said lifting arm means are operatively secured to the top of said piston means.

* * * * *